May 9, 1950 J. B. BLACK 2,506,989
FLUID IMPACT COUPLING AND CLUTCH
Filed Sept. 24, 1945 2 Sheets-Sheet 1
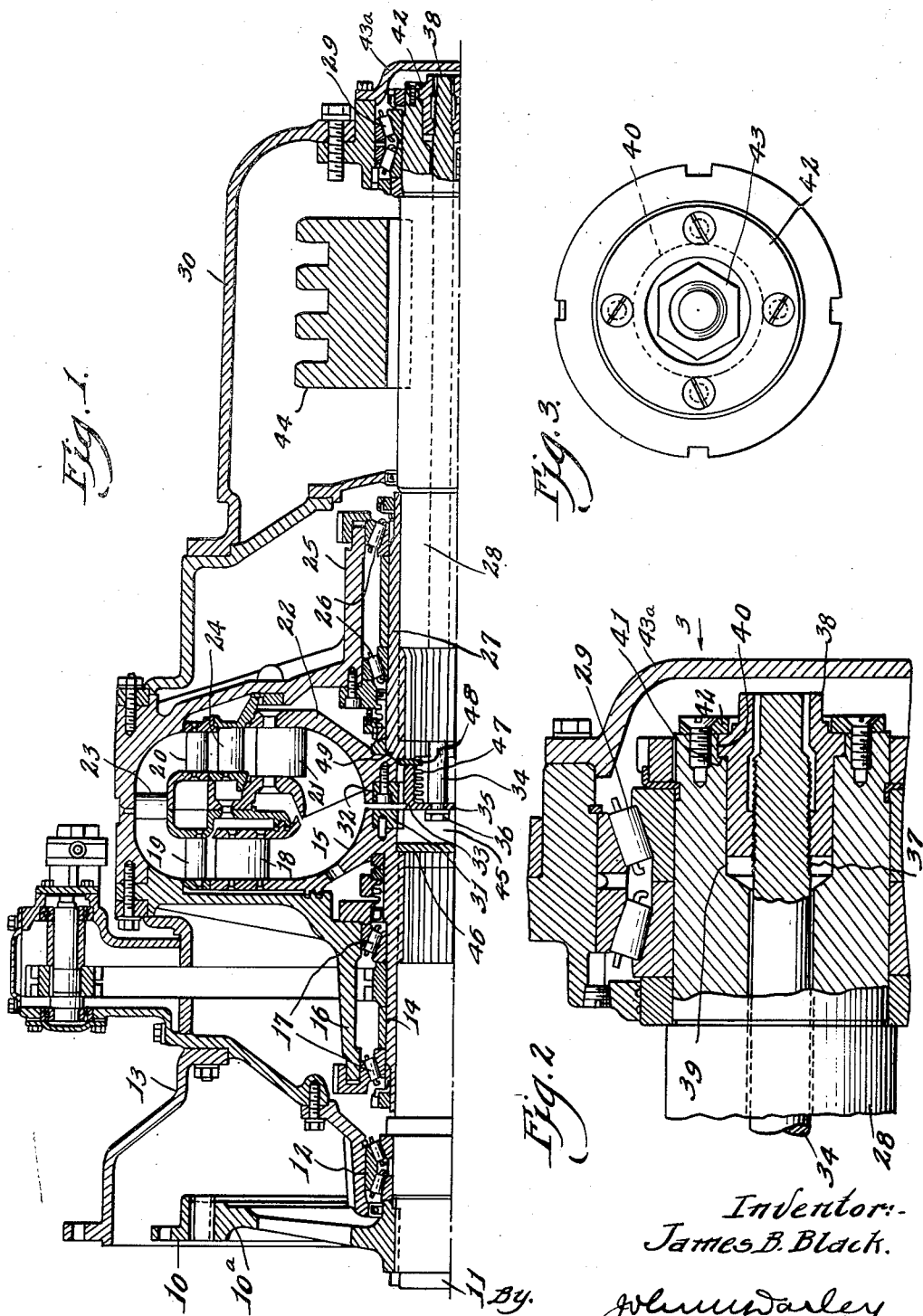
Inventor:-
James B. Black.
By John W. Darley
Attorney May 9, 1950  J. B. BLACK  2,506,989
FLUID IMPACT COUPLING AND CLUTCH
Filed Sept. 24, 1945  2 Sheets-Sheet 2
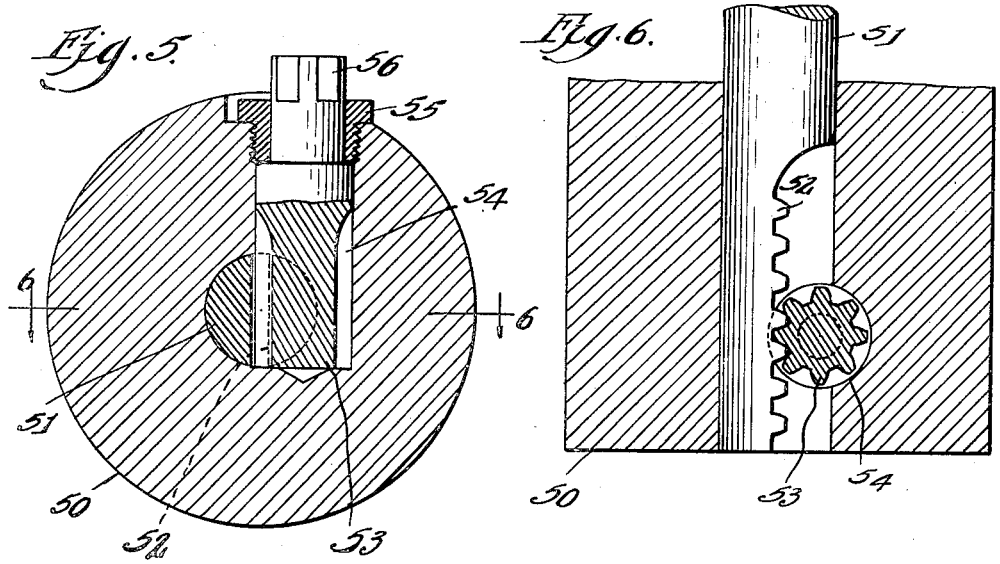
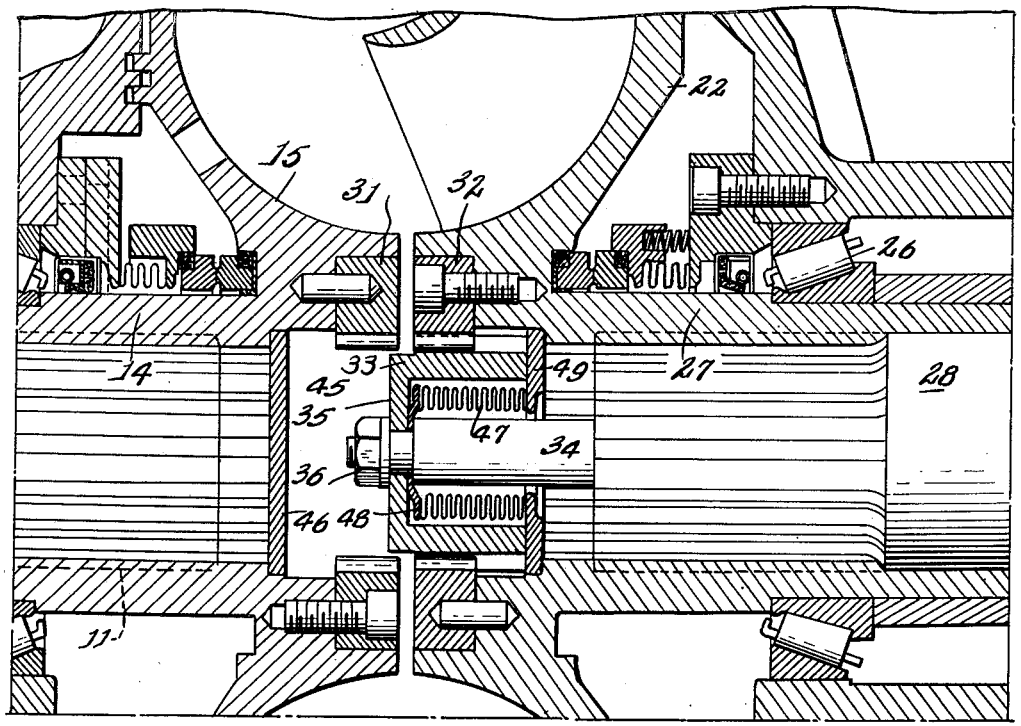
Inventor:-
James B. Black.
By John W. Darley
Attorney.

Patented May 9, 1950

2,506,989

UNITED STATES PATENT OFFICE 2,506,989

FLUID IMPACT COUPLING AND CLUTCH

James B. Black, Rockford, Ill., assignor to Twin Disc Clutch Company, Racine, Wis., a corporation of Wisconsin Application September 24, 1945, Serial No. 618,109

6 Claims. (Cl. 192—3.2)

My invention relates to hydraulic power transmissions and more particularly to important structural features that enhance the operating characteristics thereof.

In devices of this character, whether of the coupling or converter type, stoppages may occasionally occur due to loss of the working liquid or for whatever cause. Therefore, when used under those conditions which require uninterrupted service, it is desirable to provide some means that will insure the continued operation of the unit until repairs can be made.

Further, in those units having sufficient capacity to require the mounting of the driving and driven elements each on twin bearings which are customarily in abutting relation, it has been ascertained that the entire radial load is imposed on one bearing in each location with consequent overloading and excessive wear of the loaded bearing. Twin bearings are ordinarily employed in units having a capacity in excess of 250 horsepower.

It is therefore one object of the invention to provide a hydraulic power transmission which incorporates mechanical means for establishing a direct mechanical drive between the driving and driven shafts in the event of failure of the elements which normally transmit the drive hydraulically.

A further object is to devise a hydraulic power transmission unit in which the driving and driven elements are each journaled on a pair of spaced bearings whose position and spacing can be varied to divide in any ratio the radial load on the bearings.

These and further objects of the invention will be set forth in the following specification, reference being had to the accompanying drawings, and the novel means by which said objects are effectuated will be definitely pointed out in the claims.

In the drawings:

Fig. 1 is a sectional elevation showing one-half of a hydraulic torque converter embodying features of the invention.

Fig. 2 is an enlarged section of the outer end of the driven shaft showing the mechanism for determining the position of the mechanical clutching means that establishes power connection between the driving and driven elements.

Fig. 3 is a view looking in the direction of the arrow 3 in Fig. 2.

Fig. 4 is an enlarged section showing the engaging portions of the mechanical clutch device.

Fig. 5 is a transverse section of the outer end of the driven shaft showing a modified arrangement for controlling the mechanical clutch.

Fig. 6 is a section along the line 6—6 in Fig. 5.

Referring to Figs. 1 to 4, inclusive, there is illustrated a typical hydraulic torque converter which exemplifies the features of the invention and which is intended to be representative of hydraulic power transmission units, including hydraulic couplings.

The numeral 10 designates a driving ring that may be bolted to a flywheel or other power source and which has toothed driving connection with a spider 10$^a$ that is keyed to a driving shaft 11 journaled at 12 in the converter housing 13. The shaft 11 has splined, driving connection with a sleeve hub 14 forming part of an impeller 15 and the hub is journaled in a shell 16 forming part of the housing 13 by means of spaced, tapered roller bearings 17—17 which constitutes a feature of the device.

The impeller 15 carries the usual pump blades 18 which impart motion to the working liquid that impinges upon successive stages of the turbine, or runner, represented by the blades 19, 20 and 21 which are carried by a runner 22 that faces the impeller 15 in cooperating relation thereto. Disposed between the runner blades 19 and 20 are fixed reaction blades 23 and similar reaction blades 24 are interposed between the runner blades 20 and 21. The reaction blades change the flow direction of the working liquid issuing from the several turbine stages in the usual converter fashion and are carried by the housing 13.

The housing 13 is also provided with a second shell 25 that is similar and coaxially related to the shell 16 and carries a pair of spaced, tapered roller bearings 26—26 for the journal support of a sleeve hub 27 that is splinedly connected to a driven shaft 28 and constitutes part of the runner 22. The shaft 28 is journaled in bearings 29 carried by an extension 30 on the housing 13.

From the foregoing, it will be understood that, under normal operating conditions, the converter hydraulically transmits and multiplies the input torque at the output or driven shaft. If the hydraulic transmission should fail for any reason, means are provided as an integral part of the converter for insuring its continued operation through the medium of a mechanical drive that is normally inoperative and this means will now be described.

As shown in Figs. 1 and 4, the adjacent ends of the shafts 11 and 28 are spaced from each other and this space is utilized to receive the mechanical clutch. Specifically, the inner portion of the impeller 15, or the right end of the hub 14, is counterbored to receive an internal ring gear 31 while the left end of the hub 27 is similarly counterbored to receive an internal ring gear 32, these gears being slightly spaced from each other and secured to their respective hubs. A peripherally toothed drum 33, shown in retracted or non-driving position in Figs. 1 and 4, is in constant mesh with the ring gear 32 and it has sufficient length when moved towards the left, as presently described, to bridge between the ring gears 31 and 32 and thus establish a direct mechanical drive from the impeller to the rur The drum 33 is carried on one end of a control rod 34 that extends beyond the left end of the shaft 28, the transverse wall 35 of the drum being retained between a shoulder on the rod and a nut 36 threaded on the rod. The rod 34 is slidable longitudinally through the shaft 28 in coaxial relation thereto and its opposite end (see Fig. 2) is threaded at 37 to receive a nut 38 which is rotatable within a coaxial pocket 39 counterbored in the end of the shaft 28. The nut 38 is held against movement lengthwise of the shaft 28 by means of an annular flange 40 on the nut that is received in an annular channel defined by an annular shoulder 41 on the shaft and a retaining plate 42 secured to the end of the shaft. The nut 38 projects through the plate 42 and is shaped as at 43 for engagement with a wrench. A cover plate 43ª, secured to the housing extension 30, overlies the exposed end of the nut 38 to prevent inadvertent turning thereof.

Therefore, if the hydraulic power transmission becomes inoperable for any reason, mechanical power flow may be quickly established by removing the cover plate 43ª and rotating the nut 38 to thereby move the control rod 34 towards the left, as viewed in Fig. 1, until the drum 33 meshes with the ring gears 31 and 32. This clutching construction is compact and is located close to the axes of the driving and driven shafts. Power take-off from the driven shaft 28 may be effected by a sprocket 44 keyed thereto.

When operating normally, i. e., transmitting power hydraulically, any working liquid in the chamber 45 in which the drum 33 operates is retained therein by means of a barrier plate 46 (see Fig. 4) set in the chamber against the ends of the splines in the hub 14, and by a bellows seal 47 which encircles the exposed end of the control rod 34 and has its ends respectively secured to a ring 48 clamped between the drum wall 35 and a shoulder on the rod 34, and a ring 49 also set in the chamber 45 against the ends of the splines in the hub 27.

A modified method of actuating the rod 34 is shown in Figs. 5 and 6. In this modification, the driven shaft, comparable to the shaft 28, is denoted by the numeral 50, while the control rod, comparable to the rod 34, is denoted by the numeral 51. For a predetermined distance inwardly from its outer end, the rod 51 is arranged as a gear rack 52 which meshes with a transversely related, pinion actuator 53 that is rotatable in a pocket 54 extending part way through the shaft 50. The pinion 53 is retained in operative position by a nut 55 threaded in the outer end of the pocket, the upper end of the pinion being reduced in diameter and extending through and beyond the nut where it is shaped as at 56 with a wrench engaging head. Rotating the pinion 53 advances or retracts the control rod 51 as the case may be and hence determines the position of the drum 33.

A further important feature of the invention resides in the spacing of the bearings 17—17 and 26—26. These bearings are subjected to thrust and radial loads and where placed in abutting relation, which is a characteristic design, the loads are frequently concentrated on one bearing with resulting excessive wear.

The present solution of this problem, considering the situation as it affects the bearings 26, for example, contemplates that the splined portion of the sleeve hub 27 has a loose fit on the splined end of the shaft 28 and is intended to transmit torque loads only, while the remaining portion of the shaft within the sleeve hub has a close fit therewith and takes the overhung load set up by the sprocket 44. As noted in Fig. 1, the length of the sleeve hub provides a certain distributive condition that enables the tight fit of the shaft in the hub to be placed in any desired location along the hub and specifically so that the radial loads may be located to secure approximately equal life of the bearings. Preferably, the center of the radial load is placed closer to the bearing which is not predominantly subjected to thrust loads.

I claim:

1. In a power transmission, the combination of a pair of bladed members cooperably related to form a liquid working circuit for normally transmitting power hydraulically, a clutch element secured to each of the members, a power shaft to which one of the members is keyed, a control rod extending coaxially through the shaft, nut means coacting with one end of the shaft and the adjacent end of the rod for advancing and retracting the rod, and means carried by the opposite end of the rod for connecting the elements to provide direct mechanical drive between the members when the rod is advanced.

2. In a power transmission, the combination of a pair of bladed members cooperably related to form a liquid working circuit for normally transmitting power hydraulically, an internal ring gear secured to each of the members, a power shaft to which one of the members is keyed, a control rod extending coaxially through the shaft, nut means coacting with one end of the shaft and the adjacent end of the rod for advancing and retracting the rod, and a drum gear carried by the rod and meshable with the ring gears to provide direct mechanical drive between the members when the rod is advanced.

3. In a power transmission, the combination of a pair of bladed members cooperably related to form a liquid working circuit for normally transmitting power hydraulically, each member having a hub, aligned shafts keyed to the respective hubs, the opposed ends of the shafts being spaced to provide an interior pocket communicating with the circuit, a clutch element secured to each hub adjacent the pocket, a control rod slidable coaxially through one of the shafts, clutch means carried by the rod and operable in the pocket for connecting the elements to provide direct mechanical drive between the members, and means for sealing the clutch end of the rod comprising a bellows encircling the exposed portion of the rod in the pocket, one end of the bellows being secured to the rod and the other end to the associated hub.

4. In a power transmission, the combination of a pair of bladed members cooperably related to form a liquid working circuit for normally transmitting power hydraulically, each member having a hub, aligned shafts keyed to the respective hubs, the opposed ends of the shafts being spaced to provide an interior pocket communicating with the circuit, a clutch element secured to each hub adjacent the pocket, a control rod slidable coaxially through one of the shafts, means for advancing and retracting the rod through said one shaft, clutch means carried by the rod and operable in the pocket for connecting the elements to provide direct mechanical drive between the members, and means for sealing the clutch end of the rod comprising a bellows encircling the exposed portion of the rod in the pocket, one end of the bellows being secured to the rod and the other end to the associated hub.

5. In a power transmission, the combination of a pair of bladed members cooperably related to form a liquid working circuit for normally transmitting power hydraulically, each member having a hub, aligned shafts keyed to the respective hubs, the opposed ends of the shafts being spaced to provide an interior pocket communicating with the circuit, a clutch element secured to each hub adjacent the pocket, a control rod slidable coaxially through one of the shafts, nut means coacting with one end of said one shaft and the adjacent end of the rod for advancing and retracting the rod, clutch means carried by the rod and operable in the pocket for connecting the elements to provide direct mechanical drive between the members, and means for sealing the clutch end of the rod comprising a bellows encircling the exposed portion of the rod in the pocket, one end of the bellows being secured to the rod and the other end to the associated hub.

6. In a power transmission, the combination of a pair of bladed members cooperably related to form a liquid working circuit for normally transmitting power hydraulically, each member having a hub, aligned shafts keyed to the respective hubs, the opposed ends of the shafts being spaced to provide an interior pocket communicating with the circuit, a clutch element secured to each hub adjacent the pocket, a control rod extending coaxially through one of the shafts and partly formed as a gear rack, a pinion carried by said one shaft and meshing with the rack portion of the rod for advancing and retracting the rod, clutch means carried by the rod and operable in the pocket for connecting the elements to provide direct mechanical drive between the members, and means for sealing the clutch end of the rod comprising a bellows encircling the exposed portion of the rod in the pocket, one end of the bellows being secured to the rod and the other end to the associated hub.

JAMES B. BLACK.

REFERENCES CITED

The following references are of record in the file of this patent:

UNITED STATES PATENTS

| Number | Name | Date |
|---|---|---|
| Re. 21,035 | Fottinger | Mar. 28, 1939 |
| 1,806,652 | Sperry | May 26, 1931 |
| 2,168,350 | Lapsley | Aug. 8, 1939 |
| 2,205,794 | Jandasik | June 25, 1940 |
| 2,245,017 | Sinclair | June 10, 1941 |
| 2,264,478 | Lowther | Dec. 2, 1941 |